United States Patent [19]

Therssen et al.

[11] Patent Number: 5,257,312
[45] Date of Patent: Oct. 26, 1993

[54] TIME-DISCRETE STEREO DECODER

[75] Inventors: Dieter E. M. Therssen; Johan K. J. Van Ginderdeuren, both of Hasselt, Belgium

[73] Assignee: U.S. Philips Corporation, New York, N.Y.

[21] Appl. No.: 872,569

[22] Filed: Apr. 23, 1992

[30] Foreign Application Priority Data

May 3, 1991 [EP] European Pat. Off. ........ 91201051.9

[51] Int. Cl.$^5$ .............................................. H04H 5/00
[52] U.S. Cl. ........................................ 381/4; 381/7; 381/13
[58] Field of Search .................................. 381/4, 7, 13

[56] References Cited

U.S. PATENT DOCUMENTS

| 4,630,299 | 12/1986 | Welles, II et al. | 381/4 |
| 4,827,515 | 5/1989 | Reich | 381/7 |
| 5,054,070 | 10/1991 | Eckstein et al. | 381/7 |

Primary Examiner—Jin F. Ng
Assistant Examiner—Ping Wong
Attorney, Agent, or Firm—Edward W. Goodman

[57] ABSTRACT

A receiver having a signal path incorporating a tuner, a demodulator circuit for supplying a stereo multiplex signal having a baseband stereo sum signal (L+R), a 19 kHz stereo pilot and a stereo difference signal (L−R) which is double sideband amplitude-modulated on a suppressed 38 kHz subcarrier, a sampler for converting an analog signal into a time-discrete signal and a stereo decoder for time-division multiplex decoding of a time-discrete stereo multiplex signal into time-discrete left and right stereo signals. In order to realize an effective selection of the stereo multiplex signal by an easily integrable low-pass filter, the stereo decoder includes a time-discrete halfband low-pass filter circuit having a finite impulse response, with a transition band which is substantially located in the frequency range of said modulated stereo difference signal and with a half-value transfer which is located at the frequency of said 38 kHz stereo subcarrier. The filter circuit has a substantially linear amplitude transfer characteristic as well as a linear phase transfer characteristic in the transition band. The receiver also includes an interpolation circuit which is coupled to an output of the filter circuit for converting time-sequential even and odd sampling values of the output signal of the filter circuit into time-sequential pairs of simultaneously occurring sampling values, and a dematrixing circuit coupled to the interpolation circuit for a linear combination of said pairs of sampling values and a compensation of the crosstalk between the left and right stereo signals caused by the filter circuit.

7 Claims, 2 Drawing Sheets

TIME-DISCRETE STEREO DECODER

BACKGROUND OF THE INVENTION

1. Field of the Invention

The invention relates to a receiver having a signal path incorporating a tuner, a demodulator circuit for supplying a stereo multiplex signal comprising a baseband stereo sum signal (L+R), a 19 kHz stereo pilot and a stereo difference signal (L−R) which is double sideband amplitude-modulated on a suppressed 38 kHz subcarrier, a sampler for converting an analog signal into a time-discrete signal and a stereo decoder for time-division multiplex decoding of a time-discrete stereo multiplex signal into time-discrete left and right stereo signals.

2. Description of the Related Art

A receiver of this type is known per se, for example, from the article "Digital Signal Processing type Stereo FM Receiver" by M. Hagiwara et al., published in IEEE Transactions on Consumer Electronics, Vol. CE-32, No. 1, February 1986, pp. 37–43.

In the known receiver a desired RF-FM reception signal is converted into an FM-IF signal by means of the tuner. This FM-IF signal is demodulated in the demodulator circuit. When being tuned to an FM stereo transmitter, the desired baseband modulation signal thus obtained comprises a stereo multiplex signal. Such a baseband stereo multiplex signal comprises a stereo sum signal (L+R) between 0 and 15 kHz, a stereo pilot at 19 kHz and a stereo difference signal (L−R) which is double sideband amplitude-modulated on a suppressed 38 kHz subcarrier. In the known receiver this baseband modulation signal and hence the stereo multiplex signal are applied in a digitized form (i.e. time and amplitude-discrete) to the stereo decoder which decodes the digital stereo multiplex signal into left and right stereo signals L and R. The sampler, which may be arranged, for example, upstream or downstream of the demodulator circuit or which may be incorporated in the demodulator circuit is, used for the digitization.

However, outside the frequency range of the stereo multiplex signal, the baseband modulation signal, may also comprise additional information such as, for example, radio data signals (RDS) and/or traffic transmitter identification (ARI) signals which are modulated on a 57 kHz RDS carrier. In practice it appears to be necessary to filter the digital stereo multiplex signal before decoding this signal, inter alia to prevent aliasing of these additional signals. Due to the comparatively small frequency space between the highest frequency in the stereo multiplex signal and the frequency range around said 57 kHz RDS carrier required for said additional information, stringent selectivity requirements are imposed on the filters for selecting the stereo multiplex signal. Such filters are complex and difficult to integrate, which makes them comparatively expensive.

SUMMARY OF THE INVENTION

It is an object of the invention to provide a receiver of the type described in the opening paragraph using a time-discrete signal processing in at least the stereo decoder in which a time-discrete baseband stereo multiplex signal is effectively selected and decoded with circuits which can be very easily integrated.

According to the invention, a receiver having a signal path incorporating a tuner, a demodulator circuit for supplying a stereo multiplex signal comprising a baseband stereo sum signal (L+R), a 19 kHz stereo pilot and a stereo difference signal (L−R) which is double sideband amplitude-modulated on a suppressed 38 kHz subcarrier, a sampler for converting an analog signal into a time-discrete signal and a stereo decoder for time-division multiplex decoding of a time-discrete stereo multiplex signal into time-discrete left and right stereo signals, is therefore characterized in that the stereo decoder comprises a time-discrete halfband low-pass filter circuit having a finite impulse response and a substantially constant group delay time, with a low-pass edge in the amplitude transfer characteristic located in a transition band which has at least a part in common with the frequency range of said modulated stereo difference signal and with a half-value transfer which is located at the frequency of said 38 kHz stereo subcarrier with respect to which the low-pass edge is substantially point-symmetrical, said receiver also including an interpolation circuit which is coupled to an output of the filter circuit for converting time-sequential even and odd sampling values of the output signal of the filter circuit into time-sequential pairs of simultaneously occurring sampling values, and a dematrixing circuit coupled to the interpolation circuit for a linear combination of said pairs of sampling values and a compensation of the crosstalk between the left and right stereo signals caused by the filter circuit.

A selective digital stereo decoder for use in such a receiver including a filter circuit for selecting the stereo multiplex signal as well as for reducing or decimating the sampling frequency of the stereo multiplex signal is known per se, for example, from European Patent Application no. 308,520.

The low-pass edge of the filter circuit of this known stereo decoder is, however, comparatively steep so that this filter circuit is very complex and requires an output sampling frequency of 6×38 kHz.

The invention is based on the recognition that a selection of the stereo multiplex signal without any noticeable loss of signal information, on the one hand, and a sufficient suppression of signals in the frequency range above that of the stereo multiplex signal, on the other hand, is possible with a comparatively weak selective low-pass filter by giving such a filter circuit a substantially linear phase transfer and by admitting a suppression of the stereo signal in the stereo multiplex signal, which increases with the frequency in such a way that:

a half-value transfer at the 38 kHz subcarrier is obtained, i.e. the filter circuit halves the amplitude value of a 38 kHz input signal applied to the filter circuit, i.e. reduces it by 6 dB, and that a low-pass edge in the amplitude transfer characteristic of the filter circuit is obtained which with respect to the point on this edge where said half-value transfer occurs is mainly symmetrical. A property thereof is that the low-pass filter circuit has a frequency-dependent amplitude variation in the transition band, at which the sum of the frequency components located at frequency values substantially symmetrically around the 38 kHz subcarrier is substantially constant and equal to the frequency components in the passband located in the transition band.

When using the measure according to the invention, not only the above-mentioned envisaged selection of the stereo multiplex signal to be decoded and the suppression of signals above the frequency range of the stereo multiplex signal is obtained with said time-discrete low-pass filter, but an improvement of the signal-to-noise ratio is also achieved with respect to the known stereo decoder. Moreover, it is sufficient to use a much lower output sampling frequency without any loss of signal information than in said known case.

The frequency-dependent suppression of the stereo difference signal caused by the low-pass filter circuit gives rise to a crosstalk defined by this suppression which can be simply eliminated by means of a suitably chosen linear signal combination so that a dematrixing of the left and right stereo audio signal is obtained.

A preferred embodiment of a receiver according to the invention is therefore characterized in that the dematrixing circuit comprises first and second dematrixing stages, in which in both dematrixing stages, a linear sum and difference combination of sampling values is realized.

A further preferred embodiment, in which a correct dematrixing is possible with a comparatively simple circuit configuration, is characterized in that the dematrixing circuit comprises first and second signal combination stages, in which first signal combination stage, a sum as well as a difference formation of the output signal samplings of the interpolation circuit is effected, which results in a sum signal and a difference signal, respectively, and in which second signal combination stage, a sum and difference formation of said sum and difference signals is effected.

A further preferred embodiment, in which a time alignment of even and odd sampling values of the output signal of the filter circuit required for a correct dematrixing is obtained in an effective way, is characterized in that the interpolation circuit includes an all-pass filter for an amplitude-independent phase shift of at least one of said even and odd sampling values of the output signal of the filter circuit, which phase shift compensates the phase difference between the even and odd sampling values.

A further preferred embodiment is characterized in that the filter circuit comprises a delay compensation branch and a signal branch for separately processing even and odd input signal samplings, the delay compensation branch comprising a number of n cascade-arranged delay circuits and the signal branch comprising a cascade circuit of first to (2n+1)th delay circuits, as well as parallel first to (n+1)th coefficient multipliers, the output signal values of the first to (n+1)th coefficient multipliers being added to the signal samplings which are located time-symmetrically around the (n+1)th delay circuit, said filter circuit having an adder stage for mutually adding the output sampling values of the delay compensation branch, the (2n+1)th delay circuit and the first coefficient multiplier.

When this measure is used, the filter circuit and a further decimation of the sampling frequency can be realized in a simple manner.

Moreover, the signal processing in such a filter circuit also provides the possibility of using substantially all elements of said low-pass filter circuit in a simple manner for realizing a high-pass selection. Said additional signals above the frequency range of the stereo multiplex signal can then be selected in an effective manner, while the stereo multiplex signal can be suppressed to a sufficient extent. To this end the receiver according to the invention is preferably characterized by a halfband high-pass filter circuit which has the same half-value frequency, order and group delay time with respect to the low-pass filter circuit and which has a high-pass edge in the amplitude characteristic located in a transition band which corresponds to that of the low-pass filter circuit, while it has the delay compensation branch and the signal branch of the low-pass filter circuit in common and is provided with a differential stage for forming the difference between the output sampling values of the delay compensation branch on the one hand and the sum of the output sampling values of the (2n+1)th delay circuit and the first coefficient multiplier on the other hand, an output of the differential stage also constituting an output of the halfband high-pass filter circuit.

BRIEF DESCRIPTION OF THE DRAWINGS

The invention will be described in greater detail by way of example with reference to the Figures shown in the drawings, which Figures only serve to illustrate the invention and in which corresponding elements have identical reference indications.

In the drawings.

DESCRIPTION OF THE PREFERRED EMBODIMENTS

Figure 1:
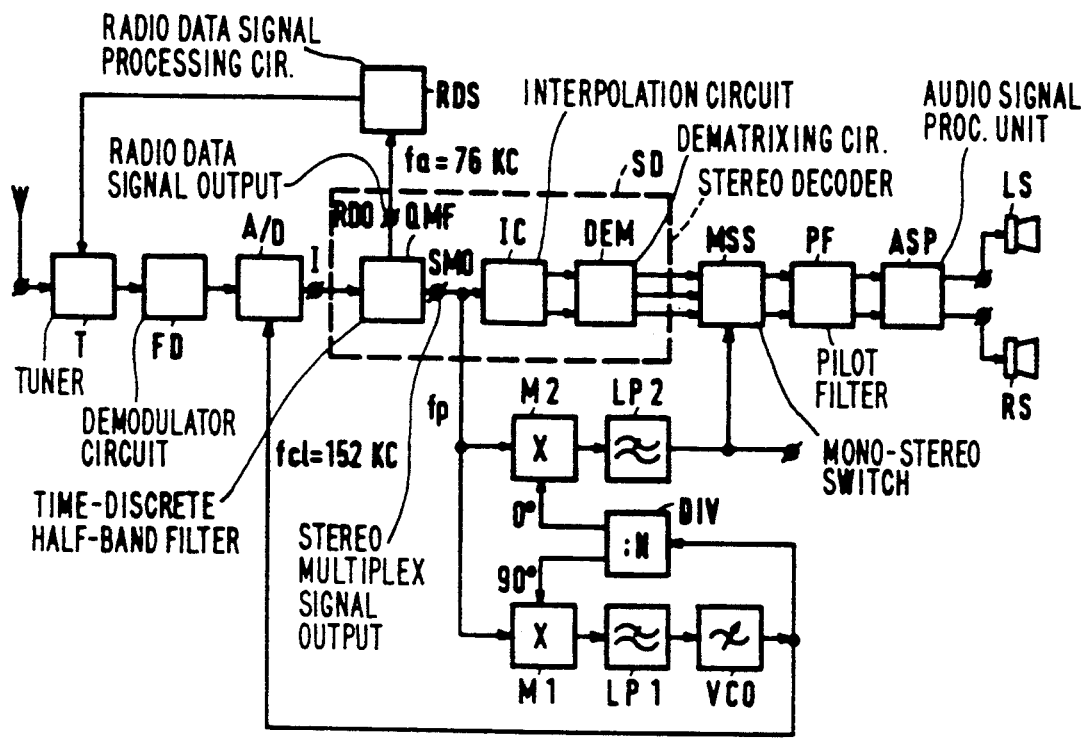
FIG. 1 shows a receiver according to the invention.

FIG. 1 shows a receiver according to the invention which is suitable for receiving radio frequency (RF) FM reception signals comprising a baseband modulation signal which is FM-modulated on an RF carrier.

Figure 3:
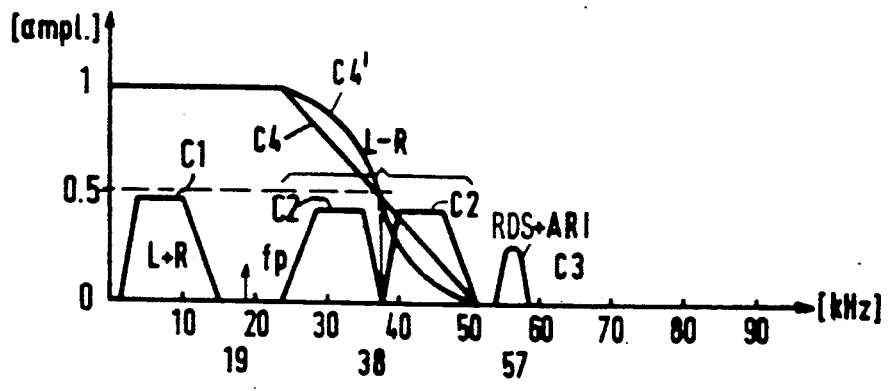
FIG. 3 shows the frequency spectrum of a stereo multiplex signal and the transfer characteristic of a time-discrete halfband low-pass filter circuit for use for a stereo decoder as shown in FIG. 2.

This baseband modulation signal may comprise a number of components. A baseband modulation signal whose frequency spectrum is shown in FIG. 3 will be taken as an example. This Figure shows by means of curve C1 a stereo sum signal (L+R) located in a frequency range between 0 and 15 kHz, with $f_p$ being a 19 kHz stereo pilot, C2 being a stereo difference signal (L−R) double sideband amplitude-modulated on a suppressed 38 kHz stereo subcarrier and located in a frequency range between 23 and 53 kHz, and C3 being a radio data signal (RDS) possibly combined with a traffic transmitter identification (ARI) signal in a 4.8 kHz band around 57 kHz.

The stereo multiplex signal in the baseband modulation signal can be considered as a 38 kHz carrier which is amplitude-modulated with one of the two stereo signals, for example L, during the even half cycles $(0-\pi)$ and is amplitude-modulated with the other stereo signal, for example, R during the odd half cycles $(\pi-2\pi)$. It is known per se from the first-mentioned article that the stereo left and stereo right audio signals are directly decoded from the stereo multiplex signal by means of a time-division multiplex decoding at the receiver end.

The receiver shown comprises, consecutively coupled to an antenna input, a tuner T, a demodulator circuit FD, a sampler or A/D converter A/D, a time-division multiplex stereo decoder SD, a mono-stereo selector MSS, a pilot filter PF, and an audio signal processing unit ASP which supplies left and right stereo audio signals to a left stereo loudspeaker LS and a right stereo loudspeaker RS, respectively. The stereo decoder SD comprises a time-discrete halfband filter circuit QMF coupled to an input I of SD, which circuit functions as a time-discrete halfband low-pass filter circuit (QMF I-SMO) between the input I and a stereo multiplex signal output SMO and as a time-discrete high-pass filter circuit (QMF I-RDO) between the input I and a radio data signal output RDO. The stereo decoder SD also comprises an interpolation circuit IC coupled to the signal output SMO, followed by a dematrixing circuit DEM. The radio data signal output RDO is coupled to a radio data signal processing unit RDS for processing a radio data signal. Dependent on the nature and the information in the received radio data signal, the radio data signal processing unit RDS may supply tuning control signals to the tuner T and/or realize a visual display of an RDS message.

In the tuner T a desired radio frequency FM reception signal in the frequency range between 88 and 108 MHz is converted into an FM intermediate frequency (IF) signal, and after intermediate frequency selection and amplification it is demodulated into an analog baseband signal in the demodulator circuit FD. The baseband modulation signal described above becomes available in an analog form at the output of the demodulator circuit FD. This analog baseband modulation signal is digitized in the A/D converter A/D in which use is made of a sampling frequency, hereinafter referred to as the first sampling frequency, which is a multiple of the 19 kHz pilot frequency and is 152 kHz in a practical implementation. Due to the digital signal processing in the time-division multiplex stereo decoder SD, a separate signal processing of the different signal components in the baseband modulation signal is of the greatest importance. In fact, it should be avoided that aliasing effects and spurious signal response cause signal components of the data channel to reach the frequency range of the baseband stereo multiplex signal, and conversely. Such a signal separation is obtained with the time-discrete halfband filter QMF which operates as a time-discrete low-pass filter circuit QMF (I-SMO) between the input I and the stereo multiplex signal output SMO. This will be further elucidated hereinafter.

The low-pass selection in the time-discrete halfband low-pass filter (QMF I-SMO) is followed by an interpolation in the interpolation circuit IC and a dematrixing in the left and right stereo audio signals in the dematrixing circuit DEM. These left and right stereo audio signals L and R become available at first and second outputs of the dematrixing circuit DEM, which dematrixing circuit DEM also has a third output at which the stereo sum signal L+R is available. A mono/stereo selection is effected in the subsequent mono-stereo selector MSS. In the pilot filter PF, 19 kHz interference components are suppressed, while in the audio signal processing unit ASP, there is a digital/analog conversion and a possible audio signal amplification and tone control, followed by a sound reproduction via LS and RS.

The clock frequencies required for the digital signal processing, which frequencies comprise those for the above-mentioned first sampling frequency, are coupled to the 19 kHz stereo pilot via a phase-coupled loop connected to the stereo multiplex signal output SMO. This phase-coupled loop comprises a multiplier stage M1 operating as a phase detector, a low-pass filter LP1, a controllable oscillator VCO and a frequency-dividing circuit DIV which is coupled to the first multiplier stage M1 via a quadrature output. The frequency-dividing circuit DIV supplies a local 19 kHz stereo pilot at this quadrature output, which pilot is in phase quadrature with respect to the 19 kHz stereo pilot in the stereo multiplex signal supplied from the stereo multiplex signal output SMO. The frequency of the controllable oscillator VCO is chosen to be such that all clock and sampling frequencies required for the digital signal processing in the receiver can be derived therefrom by means of further frequency-dividing circuits which are not shown.

The stereo multiplex signal output SMO is also coupled to a second multiplier stage M2 to which a local 19 kHz in-phase stereo pilot is applied from an in-phase output of the frequency-dividing circuit DIV. The second multiplier stage M2 operates as a synchronous amplitude detector for the 19 kHz stereo pilot in the received stereo multiplex signal. The second multiplier stage M2 applies a control signal to the mono-stereo selector MSS via a second low-pass filter LP2 for an automatic mono-stereo change-over controlled by the received 19 kHz stereo pilot.

As already noted hereinbefore, an effective suppression of signal components above the frequency range of the stereo multiplex signal is of essential importance for a satisfactory stereo signal processing. Particularly for modulation signals which, as shown in FIG. 3, comprise RDS and ARI signal components, aliasing effects and other perturbations may occur in the stereo audio signal owing to insufficient suppression of these components. For an effective selection of the stereo multiplex signal, the time-discrete halfband low-pass filter QMF (I-SMO) has an amplitude transfer characteristic which is shown in FIG. 3 in an idealized form by means of curve C4. In contrast to the filter circuits hitherto known, which have a low-pass edge in the amplitude transfer characteristic, located in a transition band between the highest frequency in the stereo multiplex signal and the lowest frequency of the RDS/ARI signal, the transition band of the low-pass edge in the amplitude transfer characteristic of the time-discrete halfband low-pass filter QMF (I-SMO) is located in the frequency range of the stereo difference signal (L−R) (curve C2) between 23 kHz and 53 kHz. Consequently, the slope of the low-pass edge of the low-pass filter circuit (QMF I-SMO) may be considerably less steep than that of the known filter circuits so as to achieve an effective suppression of the signal components located in the frequency range above that of the desired stereo multiplex signal. As a result, the low-pass filter circuit (QMF I-SMO) may be of a comparatively low order (for example, of the fifth order) and operate at a comparatively low clock frequency, so that the low-pass filter circuit (QMF I-SMO) may have a simple circuit configuration. A further result is that stereo crosstalk occurs between the even and odd sampling values, occurring at a 76 kHz sampling frequency, of the stereo multiplex signal selected by the low-pass filter circuit QMF (I-SMO). Consequently, it is no longer possible to decode the left and right stereo audio signals directly from the selected stereo multiplex signal by means of the afore-mentioned known time-division multiplex decoding method, but a dematrixing operation is required to eliminate this crosstalk. This will be further elucidated hereinafter.

To enable a linear dematrixing of the stereo multiplex signal selected by the low-pass filter circuit (QMF I-SMO), the phase transfer of the low-pass filter circuit (QMF I-SMO) should be substantially linear in its range of operation, or in other words, the group delay time of the low-pass filter circuit (QMF I-SMO) should be substantially constant. Moreover, the amplitude transfer in the passband should be substantially flat and in the frequency range of the low-pass edge, i.e. in the transition band, it should decrease with the frequency in such a way that a half-value transfer is obtained at the 38 kHz subcarrier and that the amplitude transfer characteristic is substantially symmetrical with respect to the point at which said half-value transfer occurs. The low-pass filter circuit (QMF I-SMO) therefore has the properties that the filter circuit reduces the amplitude value of a 38 kHz input signal component by half, i.e. by 6 dB, that it is sufficient to have an input or first sampling frequency of 152 kHz and an output sampling frequency of 76 kHz and that the low-pass filter circuit in the transition band has a frequency-dependent amplitude variation, in which the sum of the frequency components is substantially constant at frequency values located substantially symmetrically around the 38 kHz subcarrier and is equal to the frequency components in the passband located in the transition band.

Due to the selection in the low-pass filter QMF (I-SMO), a coherent signal addition of the lower and upper sidebands of the stereo difference signal (l−r) is, obtained, which is substantially half the amplitude of the original stereo difference signal (L−R). This results in a fixedly defined crosstalk of the stereo information which is carried by the original even and odd signal samplings. The following stereo signal combinations are obtained at the output SMO at a 76 kHz sampling frequency at the even and odd sampling instants:

| Instant: | Stereo signal combination: |
| --- | --- |
| 0 | (L + R) + (l − r) = 3/2 L + 1/2 R |
| 1 | (L + R) − (l − r) = 1/2 L + 3/2 R |
| 2 | (L + R) + (l − r) = 3/2 L + 1/2 R. |

The crosstalk between the left and right stereo signals which is introduced into a stereo multiplex signal due to the suppression by the low-pass edge of the low-pass filter QMF(I-SMO) can be subsequently compensated by means of a simple linear signal processing operation.

The low-pass edge is to start preferably after the highest frequency of the stereo sum signal (L+R) and before the lowest frequency of the stereo difference signal (L−R) and should mainly exhibit a linear decay. Time-discrete halfband low-pass filters such as the filter QMF between the input I and the output SMO are known per se and can be dimensioned in such a way that they have phase and amplitude characteristics which are substantially linear and approximate the idealized curve C4 in FIG. 3 to a sufficient extent for a correct selection of the stereo multiplex signal. Such filter circuits are very suitable for the above-mentioned selection of the stereo multiplex signal.

Figure 4:
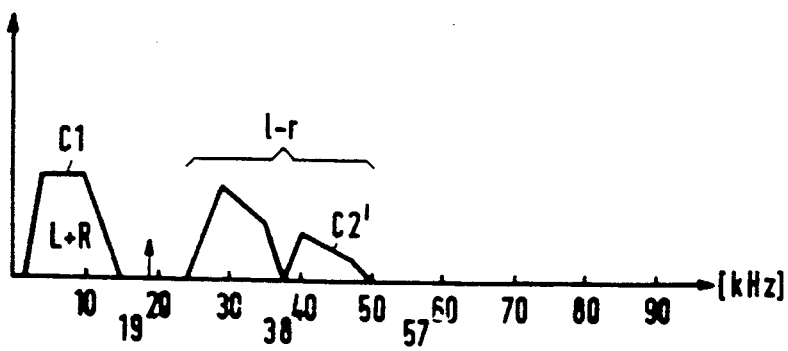
FIG. 4 shows the frequency spectrum of a stereo multiplex signal at the output of a time-discrete halfband low-pass filter circuit.

FIG. 4 shows the frequency spectrum of a stereo multiplex signal after filtering by the low-pass filter QMF (I-SMO). This Figure shows that the FM triangular noise which increases quadratically with a frequency and is large, particularly in the upper sideband of the stereo difference signal, is additionally suppressed. As a result, the signal-to-noise ratio is improved as compared with the afore-mentioned known receiver.

The alternately successive even and odd sampling values of the selected stereo multiplex signal supplied by the filter QMF at the signal output SMO occur at a sampling frequency of 76 kHz, as has been noted hereinbefore. These even and odd sampling values are mutually shifted in phase in the interpolation circuit IC in such a way that they become simultaneously available at outputs of the interpolation circuit IC at a sampling frequency of 38 kHz. Such a signal processing operation can be realized by means of a known bireciprocal halfband filter.

As already stated hereinbefore, the left and right stereo audio signals are subsequently dematrixed in the dematrixing circuit DEM by means of suitably chosen linear signal combinations.

Figure 2:
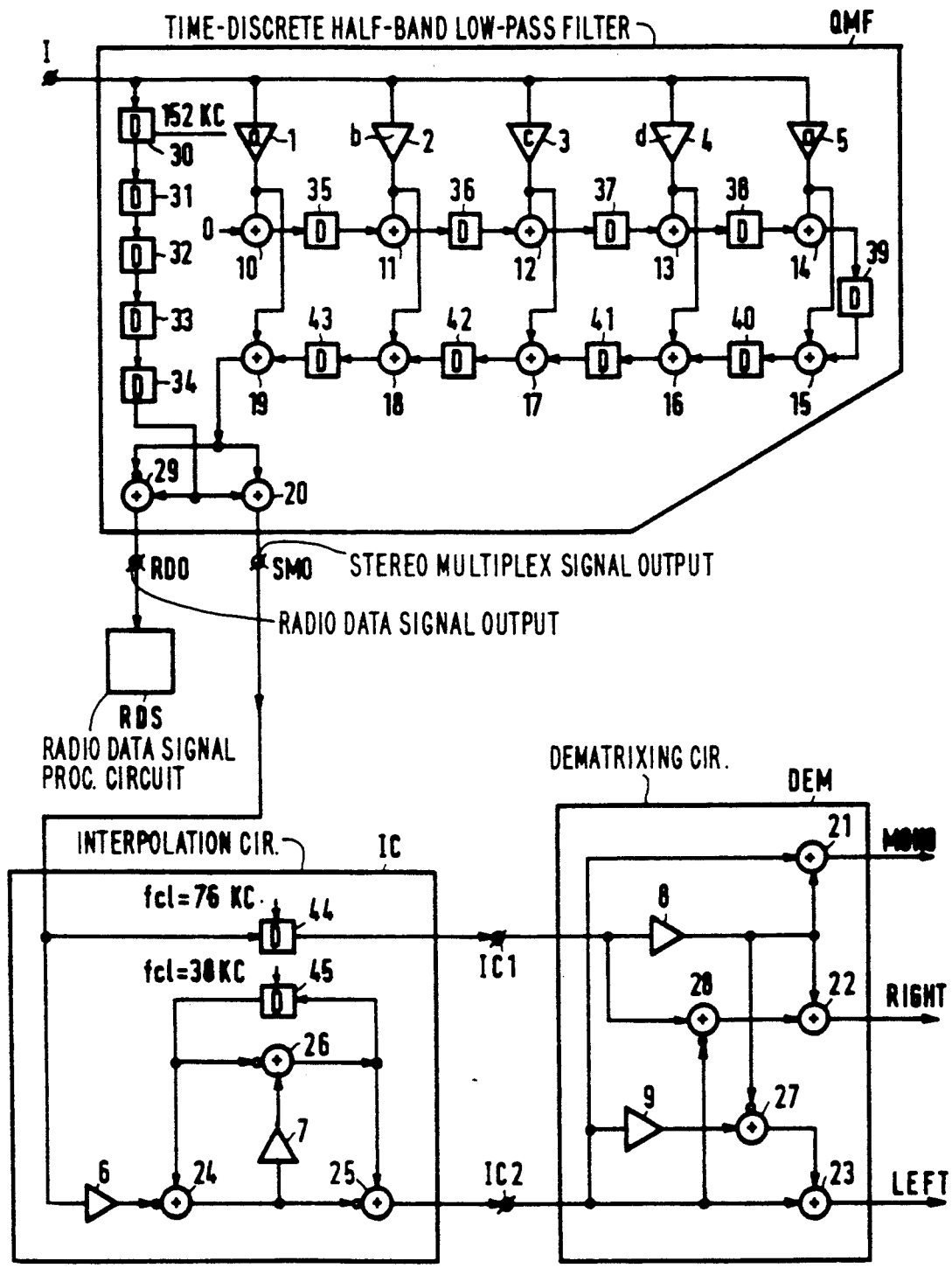
FIG. 2 shows a time-division multiplex stereo decoder for use in a receiver as shown in FIG. 1.

FIG. 2 shows a practical embodiment of a stereo decoder for use as a time-division multiplex decoder of the stereo information in a receiver as shown in FIG. 1. The time-discrete halfband low-pass filter circuit QMF (I-SMO) is constituted by an 11-tap symmetrical FIR (finite impulse response) filter of the fifth order which is known per se, for example, from the article "A trick for the design of FIR halfband filters" by P. P. Vaidyanathan and T. Q. Nguyen, published in IEEE Transactions on Circuits and Systems, Vol. CAS 34, No. 3, March 1987, pp. 297–300. The filter circuit QMF has a delay circuit 30 via which the input I is coupled to a delay compensation branch 31 to 34, and a signal branch 1 to 5, 10 to 20 and 35 to 43. The delay circuit 30 operates at a clock frequency which is equal to the first sampling frequency (152 kHz), while the other elements of the filter QMF operate at a clock frequency which is equal to half the value of the first sampling frequency (76 kHz). This provides the possibility of delaying one of the even and odd, for example, the even input signal samplings and to process, in this example, the odd samplings in the signal branch, or conversely. The delay compensation branch incorporates four cascade-arranged delayed circuits 31 to 34 and the signal branch incorporates a cascade circuit of first to ninth signal delay circuits 35 to 43. Each delay circuit 35 to 43 is incorporated between a successive pair from a series of adder circuits 10 to 19. For example, the first delay circuit 35 is incorporated between adder circuits 10 and 11, the second delay circuit is incorporated between the adder circuits 11 and 12, and so forth. Inputs of the adder circuits 10, 19; 11, 18; 12, 17; 13, 16; 14, 15 are connected to outputs of first to fifth coefficient multipliers 1 to 5, respectively. Inputs of these first to fifth coefficient multipliers 1 to 5 are connected in common to the input I of the stereo decoder SD. Due to this structure the signal samplings located symmetrically with respect to time around the fifth delay circuit 39 are added to the output signal values of the first to fifth coefficient multipliers. An input of the adder circuit 10 is connected to a reference zero value, while an output of the adder circuit 19 is connected both to the adder circuit 20 and to an inverting input of an adder circuit 29 operating as a differential stage. An output of the delay compensation branch is connected to inputs of the adder circuits 20 and 29. Outputs of these adder circuits constitute the afore-mentioned stereo multiplex signal output SMO and the radio data signal output RDO, respectively. An amplitude transfer characteristic as is illustrated by means of curve C4' in FIG. 3 is obtained by means of a suitable choice of the coefficients or weighting factors of the coefficient multipliers 1 to 5, which curve approximates the desired amplitude transfer characteristic C4 closely enough for a correct operation of the stereo decoder according to the invention.

To understand the invention, a further elaboration on the operation of the filter QMF is not necessary and reference is made to the above-mentioned article.

In the interpolation circuit IC subsequent to the filter QMF an alignment is realized of the even and odd signal samplings supplied by the filter QMF at the signal output SMO. The interpolation circuit IC is to an amplitude-independent phase shift of at least one of said even and odd sampling values of the output signal of the filter circuit QMF so that these even and odd sampling values are simultaneously available. To this end use can be made of a FIR (finite impulse response) or IIR (infinite impulse response) filter. Such filters are known per se, for example from the article "The digital all-pass filter; a first versatile signal processing building block" by P. A. Regalia et al., published in Proceedings of the IEEE, vol. 76, no. 1, January 1988, pp. 19 to 32.

The interpolation circuit IC, shown in FIG. 2, at the signal output SMO of the filter QMF has a delay branch 44 and a signal branch 6, 7, 24 to 26, 45. The delay compensation branch is provided with a delay circuit 44 which operates at a clock frequency of 76 kHz. The signal branch of the interpolation circuit IC includes a coefficient multiplier 6 coupled to the signal output SMO and having an output connected to an inverting input of a first adder stage 24 operating as a differential stage, an output of which is connected to an inverting input of an adder stage 25 also operating as a differential stage and, via a second coefficient multiplier 7, to a non-inverting input of a third adder stage 26 operating as a differential stage. An output of this third adder stage 26 is connected to a non-inverting input of the adder stage 25 and, via a delay circuit, to the non-inverting input of the adder stage 24 as well as to an inverting input of the adder stage 26. The circuits in the signal branch 6, 7, 24 to 26, 45 operate at a clock frequency which has half the value of the clock frequency of the delay circuit 44, i.e. 38 kHz. The output of the delay circuit 44 and the output of the adder stage 25 constitute outputs of the interpolation circuit IC at which the even and odd signal samplings occur simultaneously at a sampling frequency of 38 kHz. The interpolation circuit IC converts sequentially occurring even and odd signal samplings into pairwise simultaneously occurring even and odd signal samplings by means of an amplitude-independent phase shift of the even input signal samplings with respect to the odd ones, or conversely. The weighting factor of the coefficient multiplier 6 has no function in the actual signal processing in the interpolation circuit IC, but mainly serves for optimum utilization of the available register length of the digital divider circuits of IC. Said phase shift can be adjusted to a desired value by means of the weighting factor of the coefficient multiplier 7. To understand the invention, a further elaboration on the operation of the interpolation circuit IC is not necessary and reference is made to the last-mentioned article.

The dematrixing circuit has first and second signal combination stages for dematrixing the left and right stereo audio signal. The first and second signal combination stages comprise adder stages 27, 28 and adder stages 23, 22 operating as differential stages which are coupled to outputs of the adder stages 27, 28. If the output of the delay circuit 44 of the interpolation circuit is referred to as IC1 and the output of the adder stage 25 of the interpolation circuit IC is referred to as IC2, then IC1 is connected to an inverting input of the adder stage 27 via a coefficient multiplier 8 as well as to inputs of the adder stage 22 and an adder stage 21. IC1 is also coupled to a non-inverting input of the adder stage 28. IC2 is coupled to a non-inverting input of the adder stage 27 via a coefficient multiplier 9. IC2 is also coupled to an inverting input of the adder stage 28, as well as to inputs of the adder stages 23 and 21. Outputs of the adder stages 21 to 23 supply the baseband mono audio signal and the right stereo audio signal and left stereo audio signal, respectively. The coefficient multipliers 8 and 9 multiply the sampling value applied to these coefficient multipliers by weighting factors of $\frac{1}{2}$ and 2, respectively. These weighting factors are chosen to be such that they compensate the weighting factors introduced by the other coefficient multipliers of SD in the sampling values at IC1 and IC2 and simultaneously enable an effective dematrixing of the left and right stereo audio signals in DEM.

As is evident from the foregoing, the inventive idea can also be worked out with different types of filter circuits than the ones shown and the class of time-discrete halfband low-pass filter circuits may very well provide digital or non-digital versions in which, for example, switched capacitors are used and which deviate in their form from the ones shown but whose operation corresponds to what the claims state with respect to their filter properties.

The time-discrete halfband filter QMF of the symmetrical FIR filter type shown in FIG. 2 can easily be extended to a high-pass filter by means of the adder circuit 29. The filter circuit QMF has a transfer with a high-pass characteristic between the input I and the output RDO which is opposed to the low-pass characteristic illustrated by means of curve C4 in FIG. 3. This provides the possibility of using the filter QMF also for selecting the radio data signal RDS and/or the ARI signal.

In the embodiment of the time-discrete halfband filter QMF shown, a high-pass characteristic is easily obtained by means of the adder circuit 29. As is known from the article relating to this filter, the time-discrete halfband filter circuit QMF operating as a high-pass filter between the input I and the radio data signal output RDO has the same half-value frequency, order and group delay time as the low-pass filter circuit, a high-pass edge in the amplitude characteristic located in a transition band which corresponds to that of the low-pass filter circuit, and it has the delay compensation branch and the signal branch of the low-pass filter circuit in common. The high-pass filter circuit is provided with a differential stage for forming the difference between the output sampling values of the delay compensation branch, on the one hand, and the sum of the output sampling values of the (2n+1)th delay circuit and the first coefficient multiplier, on the other hand. An output of the differential stage then also constitutes an output of the halfband high-pass filter circuit.

We claim:

1. A receiver having a signal path incorporating a tuner, a demodulator circuit for supplying a stereo multiplex signal comprising a baseband stereo sum signal (L+R), a 19 kHz stereo pilot and a stereo difference signal (L−R) which is double sideband amplitude-modulated on a suppressed 38 kHz subcarrier, a sampler for converting an analog signal into a time-discrete signal and a stereo decoder for time-division multiplex decoding of a time-discrete stereo multiplex signal into time-discrete left and right stereo signals, characterized in that the stereo decoder comprises a time-discrete halfband low-pass filter circuit having a finite impulse response and a substantially constant group delay time, said time-discrete halfband low-pass filter including a low-pass edge in the amplitude transfer characteristic having a transition band which has at least a part in common with the frequency range of said modulated stereo difference signal, and a half-value of the amplitude transfer characteristic located in frequency, at said 38 kHz stereo subcarrier, whereby, with respect to the frequency of said half-value of said amplitude transfer characteristic, low-pass edge is substantially point-symmetrical, said receiver also including an interpolation circuit which is coupled to an output of the filter circuit for converting time-sequential even and odd sampling values of the output signal of the filter circuit into time-sequential pairs of simultaneously occurring sampling values, and a dematrixing circuit coupled to the interpolation circuit for a linear combination of said pairs of sampling values and a compensation of the crosstalk between the left and right stereo signals caused by the filter circuit.

2. A receiver as claimed in claim 1, characterized in that the interpolation circuit includes an all-pass filter for an amplitude-independent phase shift of at least one of said even and odd sampling values of the output signal of the low-pass filter circuit wherein the phase shift compensates the phase difference between the even and odd sampling values.

3. A receiver as claimed in claim 2, characterized in that an input of the interpolation circuit is coupled to a first output of the interpolation circuit via a delay circuit, the all-pass filter device comprises first to third adder stages each having an inverting and a non-inverting input and an output, the input of the interpolation circuit is connected to the inverting input of the first adder stage via a first coefficient multiplier, the output of said first adder stage is connected to the inverting input of the second adder stage as well as to the non-inverting input of the third adder stage via a second coefficient multiplier, the output of the third adder stage is coupled to the non-inverting input of the second adder stage as well as to the input of a further delay circuit, the output of said further delay circuit is connected to the non-inverting input of the first adder stage as well as to the inverting input of the third adder stage and the output of the second adder stage constitutes a second output of the interpolation circuit.

4. A receiver as claimed in claim 1, characterized in that the dematrixing circuit comprises first and second dematrixing stages, in the two dematrixing stages a linear sum and difference combination of sampling values is obtained.

5. A receiver as claimed in claim 4, characterized in that the dematrixing circuit comprises first and second signal combination stages, in the first signal combination stage, a sum as well as a difference formation of the output signal samplings of the interpolation circuit is effected, which results in a sum signal and a difference signal, respectively, and in the second signal combination stage, a sum and difference formation of said sum and difference signal is effected.

6. A receiver as claimed in claim 1, characterized in that the low-pass filter circuit comprises a delay compensation branch and a signal branch for separately processing even and odd input signal samplings, the delay compensation branch comprising a number of n cascade-arranged delay circuits and the signal branch comprising a cascade circuit of first to $(2n+1)$th delay circuits, as well as first to $(n+1)$th coefficient multipliers to which the input signal samplings are applied in parallel, the output signal values of the first to $(n+1)$th coefficient multipliers being added to the signal samplings which are located time-symmetrically around the $(n+1)$th delay circuit, said filter circuit having an adder stage for mutually adding the output sampling values of the delay compensation branch, the $(2n+1)$th delay circuit and the first coefficient multiplier.

7. A receiver as claimed in claim 4, characterized in that said receiver further comprises a halfband high-pass filter circuit which has the same frequency of the half-value amplitude sensor, order and group delay time with respect to the low-pass filter circuit for providing additional signals in an input signal applied to the receiver which have frequencies above the frequency range of said stereo multiplex signal, and which has a high-pass edge in the amplitude characteristic located in a transition band which corresponds to that of the low-pass filter circuit, said halfband high-pass filter circuit sharing the delay compensation and the signal branch of the low-pass filter circuit and having a differential stage for forming the difference between the output sampling values of the delay compensation branch, and the sum of the output sampling values of the $(2n+1)$th delay circuit and the first coefficient multiplier, an output of the differential stage also constituting an output of the halfband high-pass filter circuit.

* * * * *